: US006022004A

United States Patent [19]
Kelm et al.

[11] Patent Number: 6,022,004
[45] Date of Patent: Feb. 8, 2000

[54] SELF-LUBRICATING FLUID CYLINDER

[75] Inventors: Henry J. Kelm, Litchfield; Edward C. Kuhar, Richmond Heights, both of Ohio

[73] Assignee: Barnes Group, Inc., Bristol, Conn.

[21] Appl. No.: 09/018,753

[22] Filed: Feb. 4, 1998

[51] Int. Cl.[7] .................................................. F16F 5/00
[52] U.S. Cl. ..................................... 267/119; 267/130
[58] Field of Search ............................ 188/315; 267/119, 267/130; 92/153, 154, 156, 163, 165 R, 169.4; 91/46

[56] References Cited

U.S. PATENT DOCUMENTS

| | | | |
|---|---|---|---|
| 4,005,763 | 2/1977 | Wallis | 267/119 |
| 4,044,859 | 8/1977 | Wallis . | |
| 4,342,448 | 8/1982 | Wallis . | |
| 4,691,902 | 9/1987 | Kadis | 267/119 |
| 4,815,718 | 3/1989 | Kadis | 267/119 |
| 5,088,698 | 2/1992 | Wallis | 267/119 |
| 5,172,892 | 12/1992 | Wallis | 267/119 |
| 5,339,932 | 8/1994 | Lanterman . | |
| 5,893,427 | 4/1999 | Bohuer | 180/403 |

OTHER PUBLICATIONS

International Search Report issued in connection with International Application No. PCT/US 99/02373 corresponding to this U.S. application.

*Primary Examiner*—Chris Schwartz
*Attorney, Agent, or Firm*—Vickers Daniels & Young

[57] ABSTRACT

A self-lubricating cylinder assembly for use in a press operable in an upright orientation and in an inverted orientation. The cylinder assembly contains a working fluid under pressure and lubricating oil. The cylinder assembly includes a cylinder body that has sidewalls that terminate in an opening at a first end and an end wall at a second end. The cylinder assembly further includes an interior wall assembly that connects to the cylinder body and has walls that extend within the cylinder body to the end wall. The wall assembly walls are preferably formed of a cylinder liner in connection with an insert. The cylinder liner has a piston mounted for reciprocal motion therebetween. A variable volume wall assembly space is defined as a space between the piston, the wall assembly walls and the housing end wall. An expansion reservoir is defined as a space between the side walls of the cylinder body, the wall assembly walls and the cylinder body end wall. A first passage opens to the wall assembly space and to the expansion reservoir. At least the expansion reservoir opening of the first passage is positioned below the level of the lubricating oil when the cushion assembly is in the upright orientation. Both first passage openings are positioned above the level of the lubricating oil when the cushion assembly is in the inverted orientation. A second passage opens to the wall assembly space and to the expansion reservoir. Both second passage openings are positioned above the level of the lubricating oil when the cushion assembly is in the upright orientation. The second passage opening that opens to the expansion reservoir is positioned below the level of the lubricating oil when the cushion assembly is in the inverted orientation. Lubricating oil recirculation is accomplished by means of a jet mixture of compressible working fluid and lubricating oil sprayed onto the cylinder wall by means of a controlled pressure differential of the compressible working fluid while the piston is moving during the expansion stroke of the work cycle.

36 Claims, 7 Drawing Sheets

SELF-LUBRICATING FLUID CYLINDER

BACKGROUND OF THE INVENTION

1. Field of the Invention

The present invention relates generally to fluid cylinders and more particularly to self-lubricating fluid springs used between die members of a stamping press.

2. Description of the Prior Art

The service life and reliability of a nitrogen die cylinder is directly related to the ability of the high-pressure dynamic seal to maintain minimum leakage. The ability of the high-pressure dynamic seal to maintain its proper function and operation has been found to be greatly affected by the amount and the temperature of the lubricating oil film over which the seal travels. Surface contact wear and therefore leakage of the seal occurs rapidly when the seal is allowed to travel against a cylinder wall lacking an adequate film of lubricating oil.

Most nitrogen die cylinders receive film of lubricating oil on the cylinder walls during assembly. For non self-lubricating cylinders, this film of lubricating oil is sometimes supplemented by installing an oil soaked foam wiper in a groove next to the seal. However, with time, gravity tends to pull the oil film off of the cylinder. The seal itself, on each stroke, will push excess oil off the cylinder wall making the film even thinner after each stroke. The oil soaked film wiper can maintain the oil film only for a limited time before gravity and the wiping action of the seal displace the oil to areas in the nitrogen die cylinder where the oil no longer is of any benefit.

For this reason, it is preferable for such fluid cylinders to be self-lubricating. U.S. Pat. No. 4,691,902 to Kadis and U.S. Pat. No. 4,815,718 to Kadis disclose die cylinders that are very effectively self-lubricating.

In the '902 and '718 Kadis patents, the piston and the cylinder walls define a working area, and below the working area is a well. An expansion reservoir is provided outside of and around the working area and well. A separate endcap is used to form a lower portion of the cylinder body, so that the endcap can be attached to and detached from the remainder of the cylinder body, such as by threaded engagement. A first passage is machined within the endcap in which the first passage has an inlet that opens to the well. Connected to the end of the first passage opposite to the inlet is a standpipe, which then extends outward into an upper end of the expansion reservoir. Using this configuration, the inlet of the first passage and the outlet of the standpipe are the path of communication for the lubricating oil between the working chamber/well and the expansion reservoir. When the die cylinder is in an upright orientation, lubricating oil collects along the bottom of the well and in the first passage. In the upright orientation, the inlet of the first passage is disposed below the level of the lubricating oil in the well and the outlet of the standpipe and thus provides the path of communication for the lubricating oil.

When the die cylinder of the '902 and '718 patents is in an inverted orientation, the lubricating oil collects along an opposite end of the expansion reservoir and an end of the working area opposite to the well. In this inverted orientation, the outlet of the standpipe is below the level of the lubricating oil and thus acts as an inlet for the lubricating oil to be drawn through. Therefore, the first passage is the path of communication for the lubricating oil between the working chamber/well and the expansion reservoir regardless of the orientation of the die cylinder.

The die cylinder of the '902 and '718 Kadis patents also has a second passage between the working chamber and the expansion reservoir. In both the upright orientation and the inverted orientation of the die cylinder, the second passage lies above the level of the lubricating oil. Therefore, the second passage is the path of communication for the working fluid between the working chamber/well and the expansion reservoir regardless of the orientation of the die cylinder.

As with any article of manufacture, it is advantageous to simplify the design of the die cylinder, reducing the number of parts involved, while maintaining the functionality of that die cylinder. Likewise, it would be advantageous to develop the cylinder that eliminates the need for separately manufacturing and attaching that endcap to the cylinder body, and machining a passageway through the endcap, while maintaining the functional benefits of the die cylinders disclosed in the '902 and '718 Kadis patents.

SUMMARY OF THE INVENTION

The present invention provides a self-lubricating fluid cylinder or cushion assembly for use in a press operable in an upright orientation and in an inverted orientation that effectively self-lubricates the cylinder while eliminating the necessity of several components associated with the die cylinders disclosed in the prior art.

The cushion assembly contains a working fluid, preferably nitrogen, under pressure in which the nitrogen may be introduced to the cylinder assembly through means known in the gas cylinder industry, such as through a charge tube and standpipe. The cylinder assembly further contains lubricating oil so as to have a level of lubricating oil at a first end of the cushion assembly when in the upright orientation and to have a level of lubricating oil at a second end of the cushion assembly opposite to the first end when in the inverted orientation.

The cylinder assembly includes a hollow outer housing or cylinder body. The cylinder body has sidewalls that terminate at an end wall at the first end of the cylinder body and that terminate in an opening at the second end of the cushion assembly.

The cylinder assembly further includes an interior wall assembly. The interior wall assembly has a portion that connects to the cylinder body, preferably at the cylinder body opening. The interior wall assembly has walls that extend outward from the connection portion of the wall assembly within the cylinder body to the housing end wall. The wall assembly walls are preferably formed of a cylinder liner in connection with an insert. The cylinder liner has a piston mounted for reciprocal motion therebetween. The insert is positioned between the cylinder body end wall and the cylinder liner. The insert is preferably annular, but may be of any convenient shape provided that it may mate at one end with the cylinder liner. The annular insert may be a single unitary piece, or may be formed of multiple components.

A variable volume wall assembly space is defined as a space between the piston, the wall assembly walls and the housing end wall. The wall assembly space is formed by the combination of a working chamber and a well. The working chamber is defined as the cylindrical area between the walls of the cylinder liner between the highest and lowest travel points of the piston. The well lies below the working chamber, above the cylinder body end wall and within the wall assembly walls.

An expansion reservoir is provided within the cushion assembly. The expansion reservoir is defined as a space between the side walls of the cylinder body, the wall assembly walls and the cylinder body end wall. Since the surfaces of the cylinder body side walls and the wall assembly walls are preferably cylindrical, the expansion reservoir is preferably annular in shape.

The cushion assembly incorporates a first passage that opens to the wall assembly space and to the expansion reservoir. At least the expansion reservoir opening of the first passage (and preferably both openings) is positioned below the level of the lubricating oil when the cushion assembly is in the upright orientation. Both openings of the first passage are positioned above the level of the lubricating oil when the cushion assembly is in the inverted orientation.

The recess, which is preferably cylindrical, is provided upon the housing endwall, and the wall assembly walls intersect the recess, forming the first passage. The recess is preferably formed by a cylindrical bore being provided through the housing endwall and a removable plug being disposed partially within the bore from outside of the housing. Alternatively, the first passage may be formed of an aperture or duct provided through the wall assembly wall, and preferably through the annular insert.

The cushion assembly further incorporates a second passage that opens to the wall assembly space and to the expansion reservoir. Both openings of the second passage are positioned above the level of the lubricating oil when the cushion assembly is in the upright orientation. The second passage opening that opens to the expansion reservoir is positioned below the level of the lubricating oil when the cushion assembly is in the inverted orientation. The second passage is preferably disposed through the annular insert and includes a standpipe which extends toward the second end of the housing. Thus, the standpipe opens at one end to an upper end of the expansion reservoir and connects at an opposite end to the annular insert.

The present invention provides for the recirculation of the lubricating oil and also sprays a coating of oil on the cylinder walls during each complete cycle of the piston. The lubricating oil recirculation is accomplished by means of a jet mixture of compressible working fluid and lubricating oil sprayed onto the cylinder wall by means of a controlled pressure differential of the compressible working fluid while the piston is moving during the expansion stroke of the work cycle.

Some of the lubricating oil is transferred during each stroke of the piston between working chamber/well and the expansion reservoir. Communication of the lubricating oil between the working chamber/well and the expansion reservoir is accomplished through the first passage, which is preferably a recess, when the cushion assembly is in the upright orientation. The second passage preferably includes fluid flow restriction means. Communication of the lubricating oil between the working chamber/well and the expansion reservoir is accomplished through the second passage when the cushion assembly is in the inverted orientation. The second passage preferably includes fluid flow restriction means. A pressure differential is created between the working chamber and the expansion reservoir during movement of the piston, which results in a jet mixture spray of compressible working fluid and lubricating oil for lubrication of the cylinder walls.

Other objects and advantages of the invention will become apparent from a description of certain presently preferred embodiments thereof shown in the drawings.

DETAILED DESCRIPTION OF THE PREFERRED EMBODIMENTS

Figure 1:
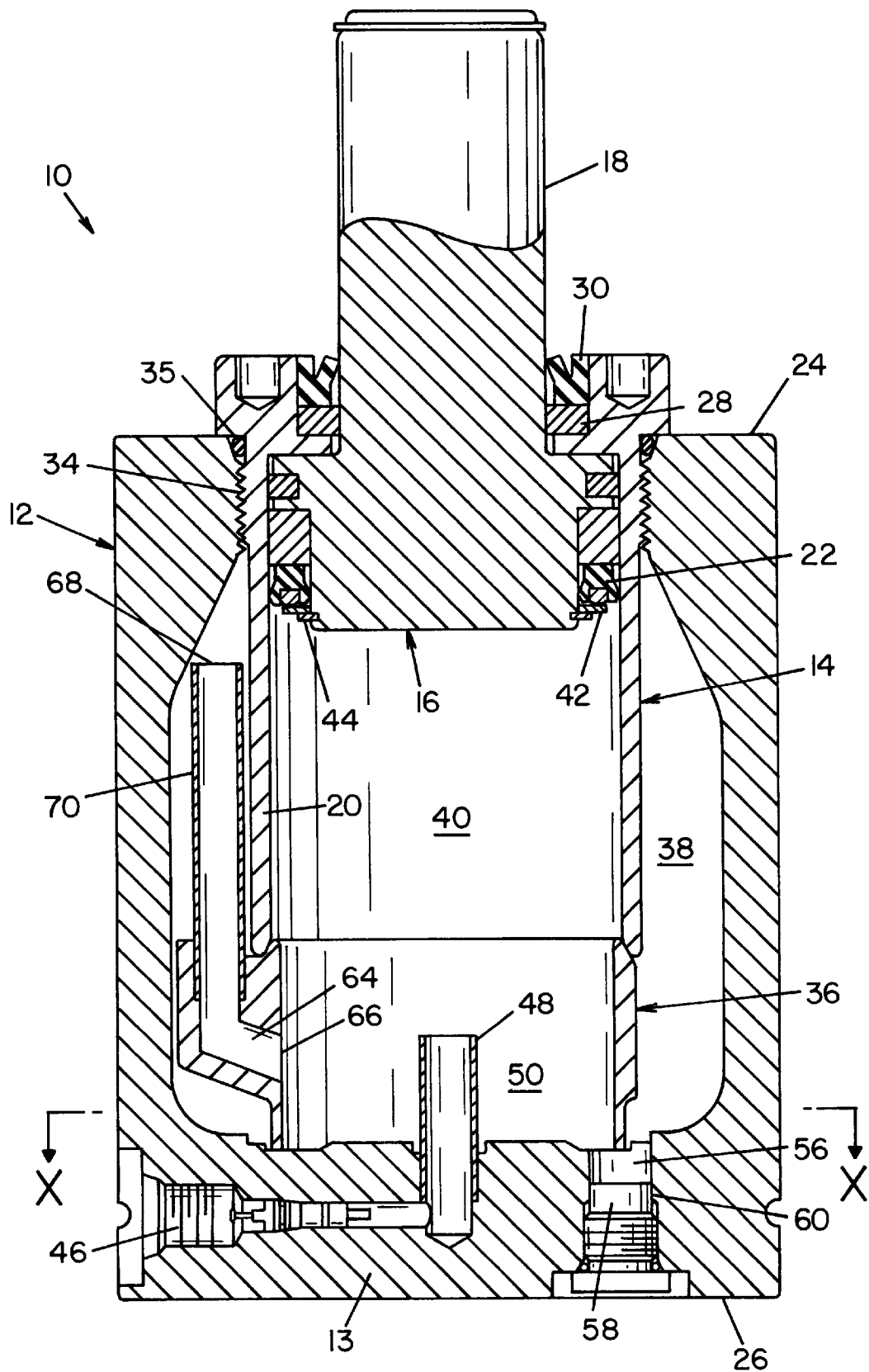
FIG. 1 is a front view, partially in cross section, of a first preferred embodiment of a self-lubricating nitrogen die cylinder in accordance with the present invention.

A self-contained nitrogen die cylinder 10 is shown in FIG. 1. For the sake of convenience, the working fluid will sometimes be referred to as "nitrogen" although it is apparent that other working fluids could be employed in the present invention. The nitrogen die cylinder 10 comprises a body 12 and a piston/cylinder unit 14 contained therein. The piston/cylinder unit 14 as employed in the present invention may be any suitable construction such as has been previously employed for nitrogen die cylinders. The piston/cylinder unit 14 comprises, in this preferred structure, a piston 16 and a piston rod 18 mounted for reciprocal motion within a cylinder liner 20. A high-pressure dynamic seal, e.g., a U-cup, 22 is provided to seal the pistons 16 with the cylinder wall 20. The high-pressure dynamic seal 22 is held in place on the periphery of the piston 16 by a washer 42 and a retaining ring 44.

The outer surface of the piston rod 18 slides against a rod bearing 28 and an annular scraping seal 30. The rod bearing 28 and the annular scraping seal 30 are secured to the cylinder assembly 20 by suitable means, such as by being pressed fit therein. Annular scraping seal 30 preferably has an inclined inner surface that faces the piston 16. In this way, scraping seal 30 scrapes or wipes the outer surface of the piston rod 18 on each stroke of the piston 16.

The piston/cylinder unit 14 is secured to the cylinder body 12 by any suitable means, such as through threaded engagement of the cylinder liner 20 to the cylinder body 12 using threads 34 and seal 35.

The cylinder wall 20 is positioned upon and forms a seal against an annular insert 36. The annular insert 36 is in turn seated upon and forms a seal against an interior surface of the cylinder body lower portion 13. The cylinder body lower portion 13 preferably has an annular groove provided thereon for receiving the annular insert 36.

The annular insert 36 may be made of any suitable material that is resistant to and can maintain its shape in the cylinder body environment, which involves the presence of a lubricating oil and temperatures reaching as high as about 250° F. Suitable materials include stainless steel, aluminum and moldable plastics, such as an acetal. Although the insert 36 is preferably annular, it is understood that the insert 36 may have other shapes. In addition, although the annular insert 36 is described as being a single piece, it is also understood that the insert 36 may be formed of multiple components.

When the cylinder assembly 20 is seated upon annular insert 36, an expansion reservoir 38 is created between the outer surfaces of the cylinder wall 20 and the annular insert 36 and the inner surface of the cylinder body 12. Since the insert 36 and the outer surface of the cylinder walls 20 are preferably cylindrical in shape and since the inner surface of the cylinder body 12 is also generally cylindrical in shape, the expansion reservoir 38 is generally annular in shape. It is, however, understood that these surfaces and thus the expansion reservoir 38 may have many alternative shapes.

For convenience, the end of the cylinder assembly 10 and the expansion reservoir 38 which is the lower end 26 when the cylinder assembly 10 is in the upright orientation, as shown in FIG. 1, will be referred to alternatively as the bottom, the lower end or the first end, regardless of the orientation of the cylinder assembly. In like fashion, the end of the cylinder assembly 10 and the expansion reservoir 38 which is the upper end 24 when the cylinder assembly 10 is in the upright orientation, will be referred to alternatively as the top, the upper end or the second end, regardless of the orientation of the cylinder assembly.

When the cylinder assembly 10 is in the upright orientation as shown in FIG. 1, and no fluid pressure differentials are acting upon the lubricating oil, the lubricating oil will generally collect at a certain level along the first end 26 of the expansion reservoir 38, along the bottom of the well 50 and in the recess 56.

A working chamber 40 is defined as the area between the walls of the cylinder liner 20 between the highest travel point of the piston 16 and the lowest travel point of the piston 16. The cylinder body 12 has a lower portion 13. In the second end of the cylinder assembly 10 is a well 50 that lies below the working chamber 40, above the cylinder body lower portion 13 and within the annular insert 36.

Disposed through the cylinder body lower portion 13 is a charge tube 46 for charging the die cylinder assembly 10 with a compressible working fluid, such as nitrogen. The charge tube 46 has a standpipe 48, which extends outward from the cylinder body lower portion 13 into the well 50 at the bottom of the cylinder assembly 10. The stand pipe 48 of the charge tube 46 extends upwardly into the well 50 so that its upper end is disposed above the level of any lubricating oil in the well 50 but below the lowest travel point of the piston 16.

The cylinder body lower portion 13 further includes a recess 56 for allowing fluid communication between the working chamber 40 and the expansion reservoir 38. The recess 56 is preferably formed by providing a bore 60 entirely through the cylinder body lower portion 13 and then providing a seal plug 58 partially into the bore 60. The portion of bore 60 that the seal plug 58 does not extend into forms the recess 56. In this way, one end of the recess 56 opens toward the well 50 while another end of the recess 56 is sealable from communication with outside of the cylinder assembly 10 by the plug 58. Plug 58, which is preferably threadably engaged to the cylinder body lower portion 13, may be removed in order to add lubricating oil to or remove lubricating oil from the cylinder assembly 10.

Annular insert 36 and the recess 56 are sized, configured and positioned such that when the insert 36 is seated upon the cylinder body lower portion 13, a lower portion of the annular insert 36 intersects the recess 56. Thus, a portion 53 of the recess 56 opens to the well 50 within the annular insert 36 and a portion 54 of the recess 56 opens to the expansion reservoir 38, as shown best in FIG. 10. As also shown best in FIG. 10, the insert 36 and recess 56 are preferably positioned with respect to one another so that insert 36 bisects recess 56, that is, portions 53 and 54 of recess 56 have approximately the same area. In this way, a path or passage is formed between the expansion reservoir 38 and the well 50 (and thus the working area 40) by way of the recess 56. As a result, any lubricating oil present in the well 50 may communicate through the recess 56 into and out of expansion reservoir 38.

A passageway 64 is also provided for allowing fluid communication between the expansion reservoir 38 and the working chamber 40. The passageway 64 has an inlet 66 leading into the well 50 in the lower portion of the working chamber 40 and an outlet 68 leading into the expansion reservoir 38. Preferably, the inlet 66 of the passageway 64 is disposed through the annular insert 36. The passageway inlet 66 is sized and positioned and the amount of lubricating oil introduced into the die cylinder assembly is selected such that the passage inlet 66 is positioned above the level of the lubricating oil.

The passageway 64 preferably contains a raised standpipe 70 leading to and providing an outlet 68 at the first end of the expansion reservoir 38. The purpose of this standpipe 70 will be explained in more detail below.

The operation of the die cylinder assembly of FIG. 1 in the upright orientation will now be described with reference to FIGS. 2 through 4.

Figure 2:
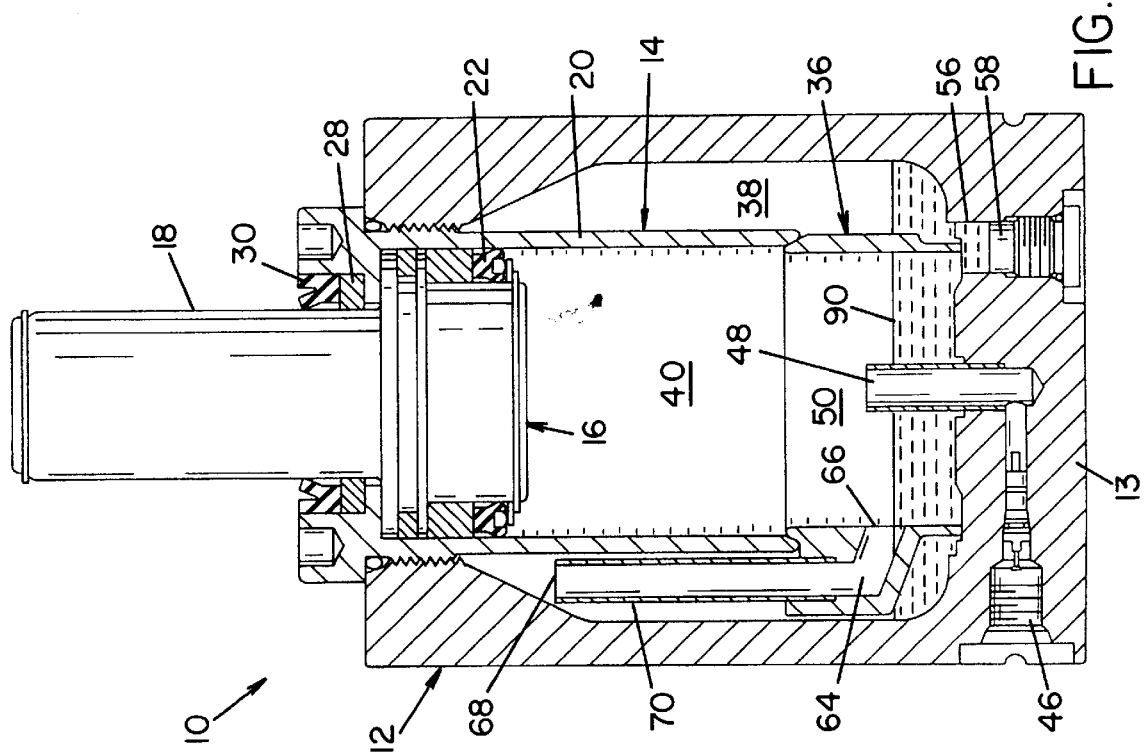
FIG. 2 is a cross sectional view of a die cylinder in accordance with the present invention shown in an upright orientation and in the die open or expanded position.

FIG. 2 shows the die cylinder assembly in the die-open position or the expanded position. In the expanded position shown in FIG. 2, piston 16 has reached its uppermost position and is ready to be drawn downward through the cylinder liner 20. Lubricating oil 90 is shown as a film on the walls of the cylinder liner 20 and in a pool in the well 50, in the bottom of the expansion reservoir 38 and in the recess 56.

The working chamber 40 and the expansion reservoir 38 are filled with a compressible working fluid, such as nitrogen. The nitrogen is under high pressure, such as about 200 psi to about 2000 psi. The gas pressure in the expansion reservoir 38 and the working chamber 40 are approximately equal since there is no flow through the recess 56 and the passageway 64.

Figure 3:
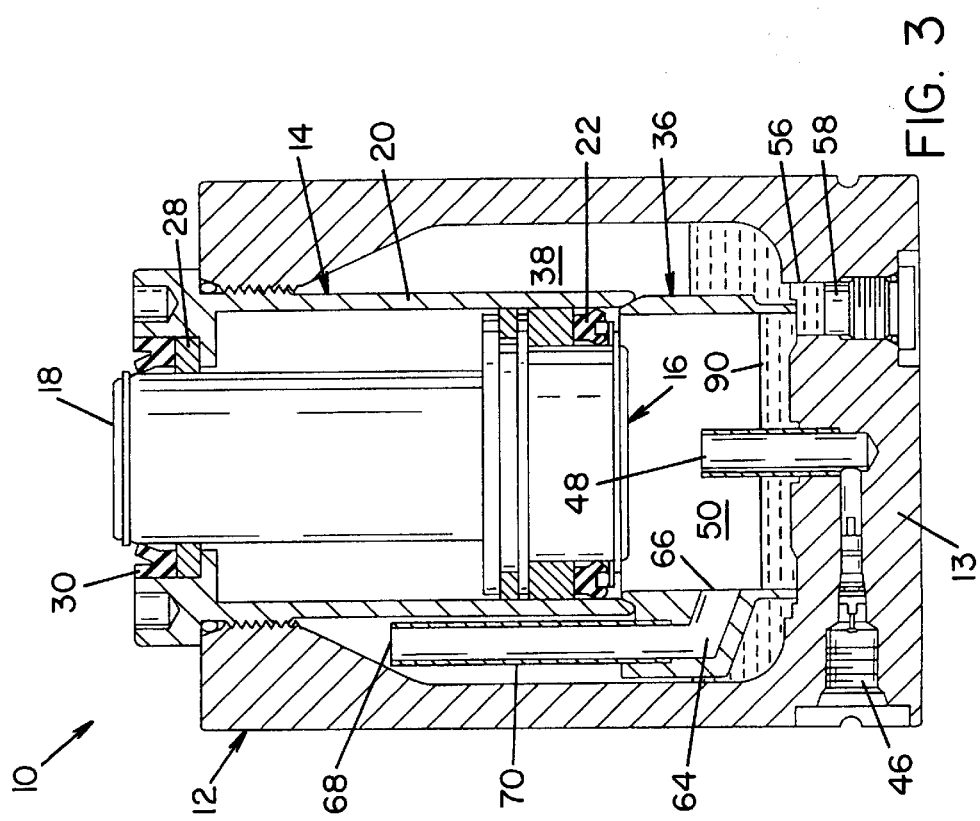
FIG. 3 is a view similar to FIG. 2 in which the die cylinder is shown in the die closed or compressed position.

FIG. 3 shows the piston 16 at the end of its downward stroke and thus in the die-closed or compressed position. As the piston 16 is compressing the working fluid in the working chamber 40, the working fluid will travel through any passage to travel to the expansion reservoir 38 in order to attempt to equalize the pressure there between. Most of the working fluid would travel through the passageway 64. However, the passageway 64 is specifically sized and configured to create a small resistance to fluid flow. Because of this resistance, some of the working fluid will travel through recess 50 into the expansion reservoir 38. As the piston 16 travels along the cylinder walls 20, the high pressure U-cup seal 22 will wipe some of the film of lubricating oil 90 off of the cylinder wall 20 and force it towards the bottom of the cylinder vessel 12 into the well 50 and the recess 56. The gas pressure will force some of the lubricating oil 90 into the expansion reservoir 38. When the piston 16 has reached the limit of its travel, it will stop compressing the working fluid in the working chamber 40 and allow the gas pressure to again equalize between the working chamber 40 and the expansion reservoir 38. Any excess lubricating oil 90 wiped off of the cylinder walls 20 will be maintained in the bottom of the well 50, in the recess 56 and in the bottom of the expansion reservoir 38.

Figure 4:
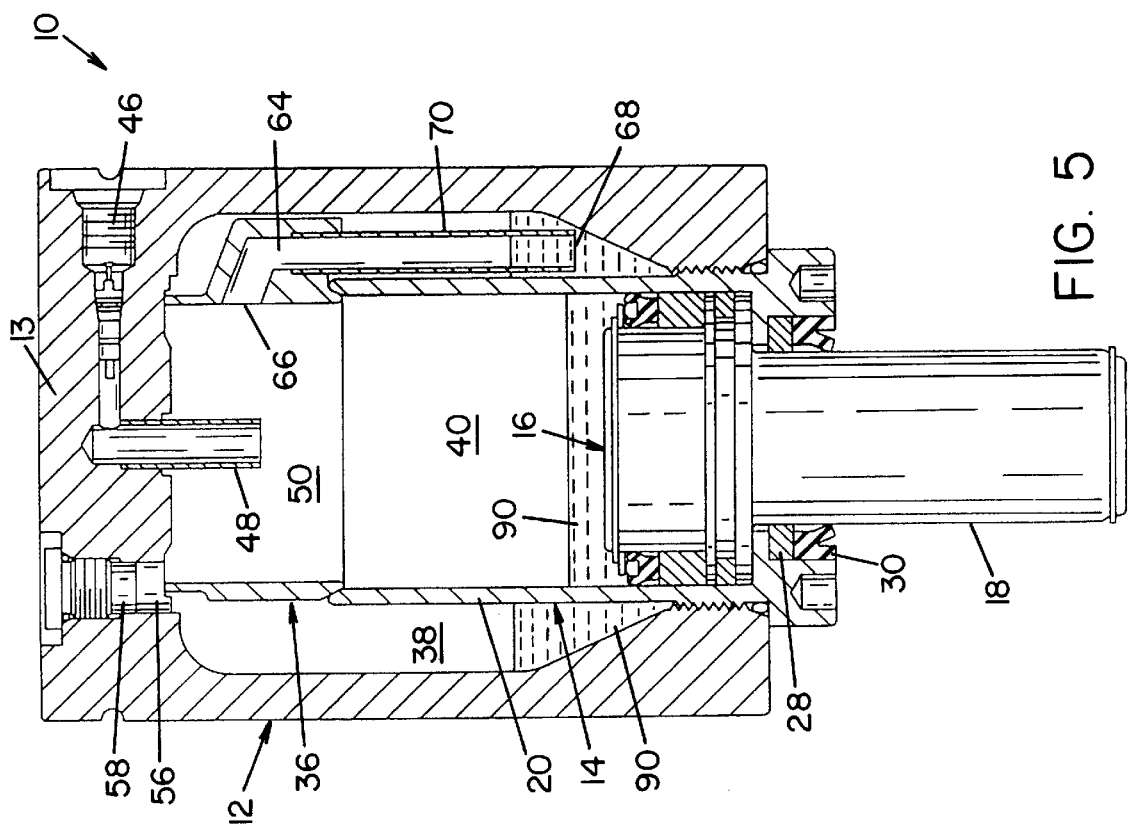
FIG. 4 is a view similar to FIG. 2 in which the die cylinder is shown with the piston being drawn again to the die open or expanded position.

Referring next to FIG. 4, the high internal working fluid pressure pushes the piston 16 to follow the press motion. As the piston 16 starts to move away from the die closed position, the gas pressure in the working chamber 40 begins to drop. The working fluid pressure in the expansion reservoir 38, being at a higher pressure, will try to equalize by allowing the flow of the working fluid back into the working chamber 40. The working fluid will flow from the expansion reservoir 38 into the working chamber 30 through the passageway 64. Again, because the passageway 64 is designed to create a small amount of resistance to fluid flow, some of the working fluid will also travel from the expansion reservoir 38 towards the working chamber 40 through the recess 56. However, before the working fluid can travel through the recess 56, the working fluid must first push any lubricating oil 90 in its path into and then through the recess 56. If the recess 56 is properly sized, the working fluid pressure will push the lubricating oil 90 through the recess 56 at a high velocity. Once the lubricating oil 90 leaves the recess 56 at a high velocity, the lubricating oil 90 will continue to travel through the well 50 and the working chamber 40, and will spray onto the walls of the cylinder liner 20. A jet mixture of the compressible working fluid and the lubricating oil 90 is thus sprayed onto the interior walls of the cylinder liner 20. The lubricating oil 90 will continue to be sprayed onto the cylinder walls 20 until most of the lubricating oil 90 is flushed out of the recess 56 or until the pressure between the working chamber 40 and the expansion reservoir 38 is equalized. In this way, each cycle of piston stroke will cause a spray of lubricating oil 90 to be delivered to the cylinder walls 20.

The operation of the die cylinder assembly of FIG. 1 in the inverted orientation will now be described with reference to FIGS. 5 through 7.

Figure 5:
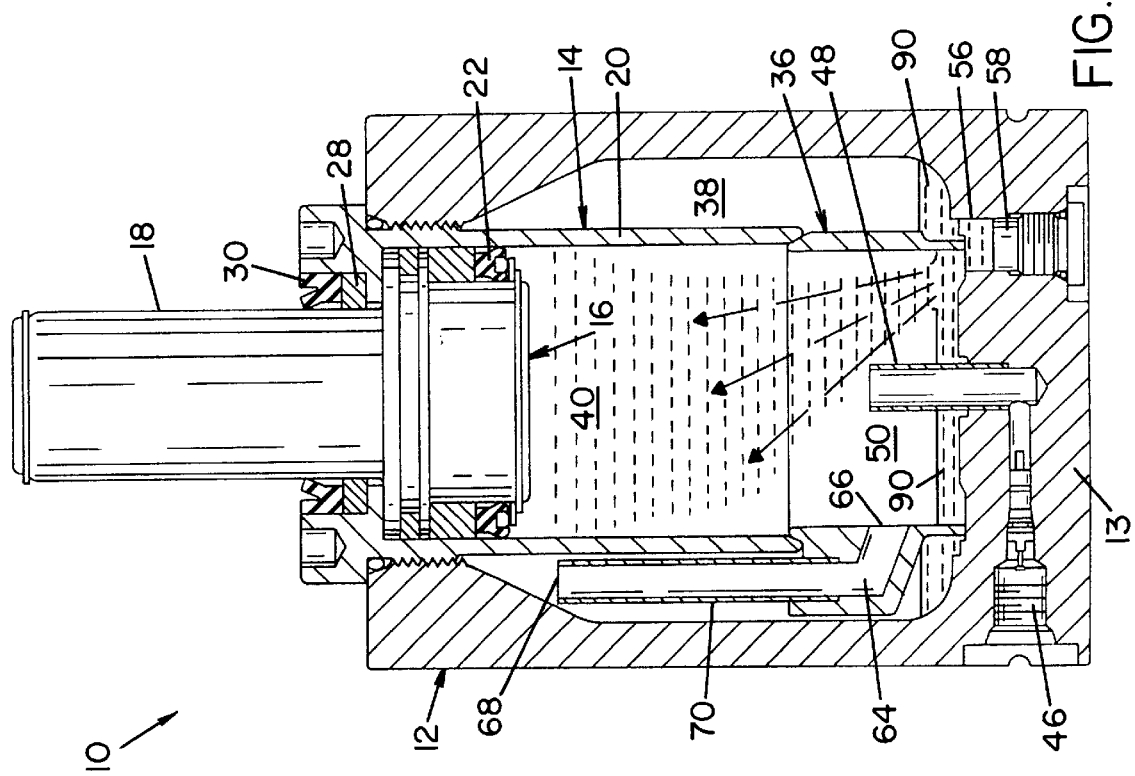
FIG. 5 is a cross-sectional view of a die cylinder in accordance with the present invention shown in an inverted orientation and in the die open or expanded position.

FIG. 5 shows the die cylinder assembly in the die-open position or the expanded position. In the expanded position shown in FIG. 5, piston 16 has reached its lowermost position and is ready to be drawn downward through the cylinder liner 20. In reference to the upright or non-inverted orientation, the functions of the recess 56 and the passageway 64 are now interchanged. Lubricating oil 90 is shown on the walls of the cylinder liner 20 and in a pool at the second end 24 of the vessel 12 and on top of the piston 16. Working chamber 40 and expansion reservoir 38 are filled with a compressible working fluid such as nitrogen, under high pressure such as 200 psi to about 2000 psi. The pressure in the expansion reservoir 38 and in the working chamber 40 is equal since there is no flow through the recess 56 and the passageway 64.

Figure 6:
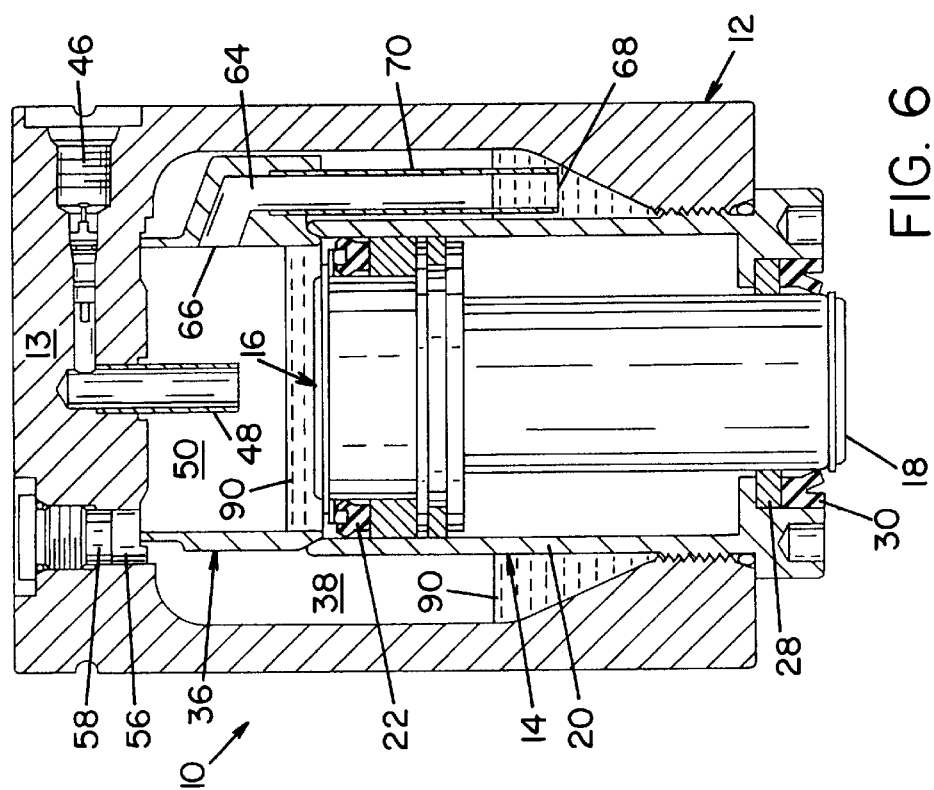
FIG. 6 is a view similar to FIG. 5 in which the die cylinder is shown in the die closed or compressed position.

FIG. 6 shows the die cylinder assembly in the die closed position or the compressed position. As the piston 16 is compressing the gas in the working chamber 40, the gas will travel through any passage to get to expansion reservoir 38 in order to attempt to equalize the pressure therebetween. Most of the working fluid would travel through the recess 56. However, the recess 56 is specifically designed to create a small resistance to fluid flow. Because of this fluid flow resistance, some of the working fluid will travel through the passageway 64. As the piston 16 travels on the cylinder walls 20, the high-pressure dynamic seal will wipe some of the oil film off of the cylinder wall and force it toward the top of vessel 12 and near the passageway 64. If the oil level reaches the passageway 64, the gas pressure will push some of the oil into the expansion reservoir 38. When the piston 16 has reached the limit of its travel, it will stop compressing the working fluid in the working chamber and allow the gas pressure to again equalize between the working chamber 40 and the expansion reservoir 38. Any excess lubricating oil 90 wiped off of the cylinder walls 20 will be maintained in the top of vessel 12, the oil passage 64, or the expansion reservoir 38.

Figure 7:
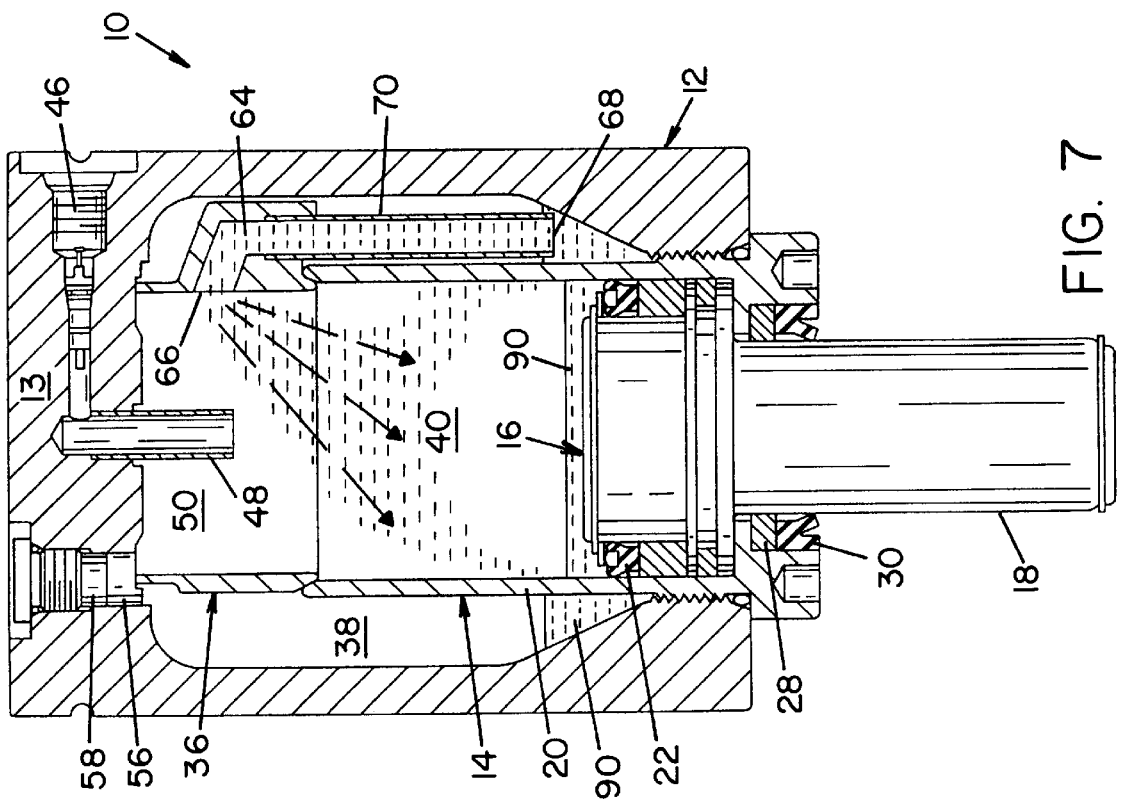
FIG. 7 is a figure similar to FIG. 5 in which the die cylinder is shown with the piston being drawn again to the die open or expanded position.

FIG. 7 shows the die cylinder assembly in the die open position or the expanded position. The high internal working fluid pressure pushes the piston 16 to follow the press motion. As the piston 16 starts to move away from the die closed position, the gas pressure in the working chamber 40 begins to drop. The working fluid pressure in the expansion reservoir 38, being at a higher pressure, will try to equalize by allowing the flow of the working fluid back into the working chamber 40. The working fluid will flow from the expansion reservoir 38 into the working chamber 40 through the recess 56. Again, because the recess 56 is designed to create a small amount of resistance to gas flow, some working fluid will also travel through the passageway 64 and the standpipe 70. However, before the working fluid can travel through the passageway 64, the working fluid must first push any lubricating oil 90 in its path into and then through the passageway 64. If the passageway 64 and recess 56 are properly sized, the working fluid pressure will push the lubricating oil 90 through the passageway 64 at a high velocity. Once the lubricating oil 90 leaves the passageway 64 at a high velocity, the lubricating oil 90 will continue to travel through the working chamber 40 and spray onto the walls of the liner 20. A jet mixture of the compressible working fluid and oil is sprayed onto the walls of the liner 20. The lubricating oil 90 will continue to be sprayed onto the liner walls 20 until the most of the lubricating oil 90 is flushed out of the passageway 64 or the pressure between the working chamber 40 and the expansion reservoir 38 is equalized.

It can be seen, then, that the recess 56 serves as the path of communication for the lubricating oil between the working chamber/well and the expansion reservoir when the die cylinder is oriented in the upright position, but is the path of communication for the working fluid when the die cylinder is oriented in the inverted position. In addition, the passageway 64 serves as the path of communication for the working fluid between the working chamber/well and the expansion reservoir when the die cylinder is oriented in the upright position, but is the path of communication for the lubricating oil when the die cylinder is oriented in the inverted position. Therefore, the functions of the recess 56 and the passageway 64 depend upon the orientation of the die cylinder.

Figure 10:
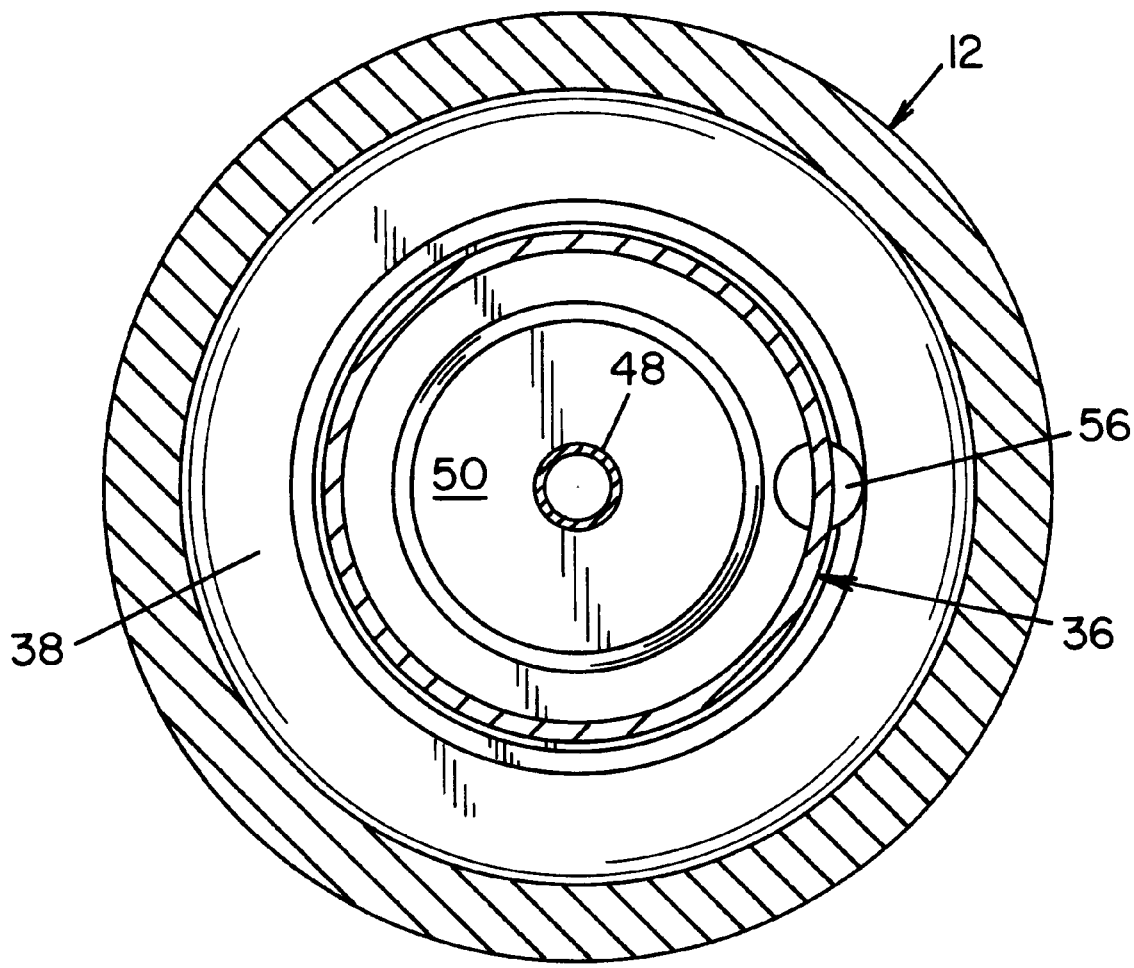
FIG. 10 is a cross sectional view taken along line X—X of FIG. 1.

A working model of the first preferred embodiment has been developed. Many of the dimensions and characteristics of the device, and particularly the passageway 64 and the recess 56/insert 36 combination, were developed empirically. The working model includes a total gas volume of the interior of the die cylinder 10 (with lubricating oil 90 provided therein) of approximately 19.7 cubic inches. Nitrogen was used as the working fluid under a pressure of about 2000 psi. A volume of approximately two ounces of lubricating oil 90 was used, which is equal to about 3.6 cubic inches. The lubricating oil 90 that was used had a viscosity that ranged from 155 SUS (or 30 centistokes) at an operating temperature of 100° F. and 43 SUS (or 5 centistokes) at an operating temperature of 212° F. The piston 16 has a diameter of about 1.5 inches and a stroke of about 4 inches, resulting in a working piston displacement or "swept volume" of approximately 7.1 cubic inches. The expansion reservoir 38 has a volume of approximately 11.6 cubic inches (with the level of lubricating oil 90 being approximately equal in the well 50 and expansion reservoir 38). Sufficient flow restriction was obtained when the passageway 64 (including the inner diameter of the standpipe 70) had a diameter of about 0.22 inches. Likewise, sufficient flow restriction was obtained when the cylindrical recess 56 had a diameter of about 0.375 inches and a depth of approximately 0.4 inches, and when the insert 36 has a wall thickness of 0.06 inches, a diameter of about 1.4 inches and is positioned so as to essentially bisect the recess 56 as shown in FIG. 10.

Figure 8:
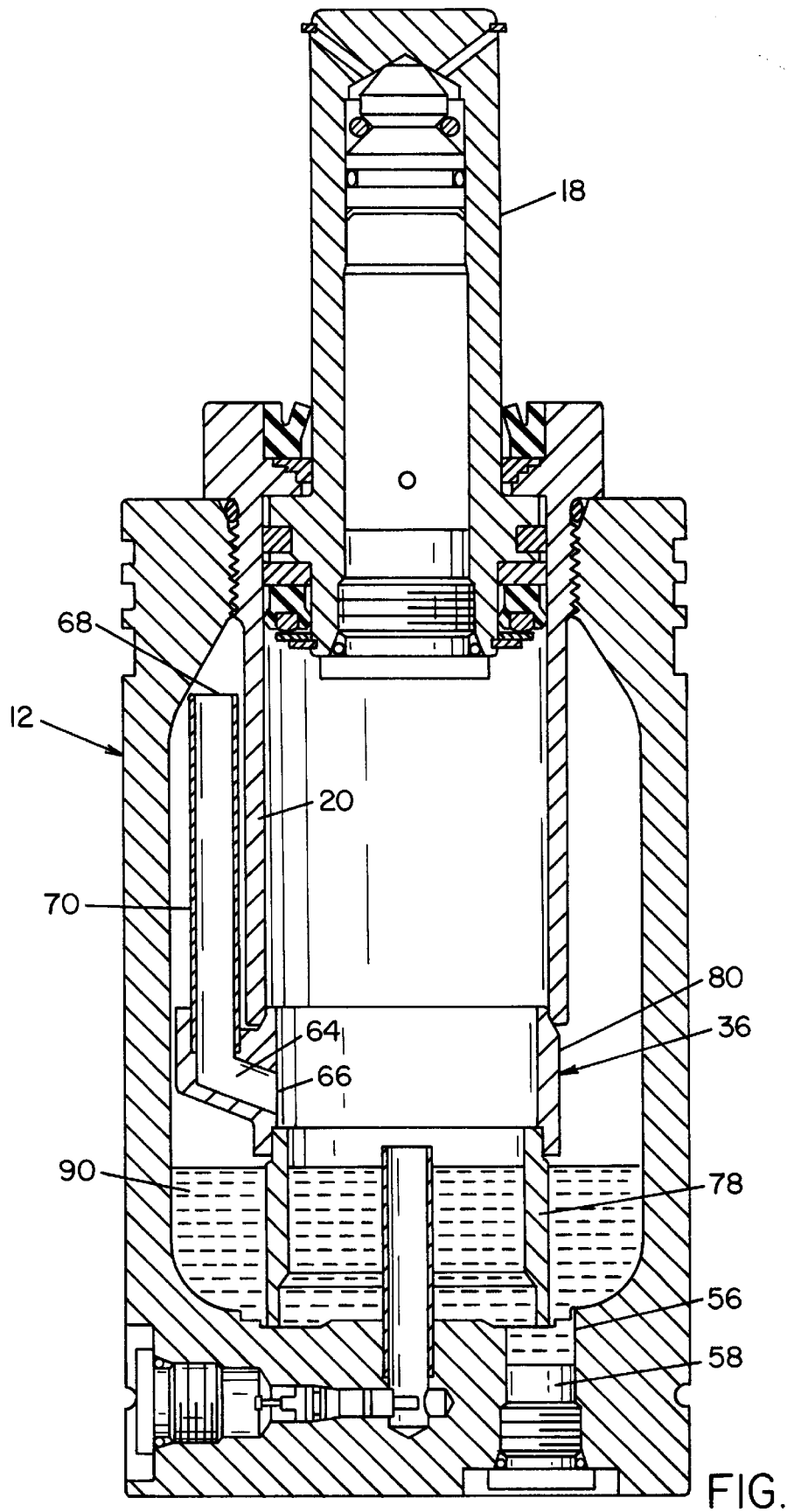
FIG. 8 is a front cross sectional view of a variation of the first preferred embodiment of the die cylinder, showing the annular insert formed of more than one component.

FIG. 8 is a front cross sectional view of a variation of the first preferred embodiment of the die cylinder. It may be advantageous, such as for ease of assembly, for the annular insert 36 to be formed of more than one component. As shown in FIG. 8, annular insert 36 may be formed of an annular seat 78 in cooperation with a section piece 80. As shown, the annular seat 78 is sized and configured to seat upon the cylinder body lower portion 13, intersecting the recess 56, as described above. Then, the section piece 80 may be seated upon the annular seat 78. The cylinder walls 20 are then positioned upon and seated upon the section piece 80.

The passageway 64 is shown extending from the section piece 80. It is readily understood, however, that depending upon the size and configuration of the cylinder body and the piston/cylinder unit 14, the passageway 64 may extend instead from the annular seat 78. It is further understood that although the annular insert 36 is shown in FIG. 8 as being formed of two components, the annular insert 36 may also be formed of more than two components.

Figure 9:
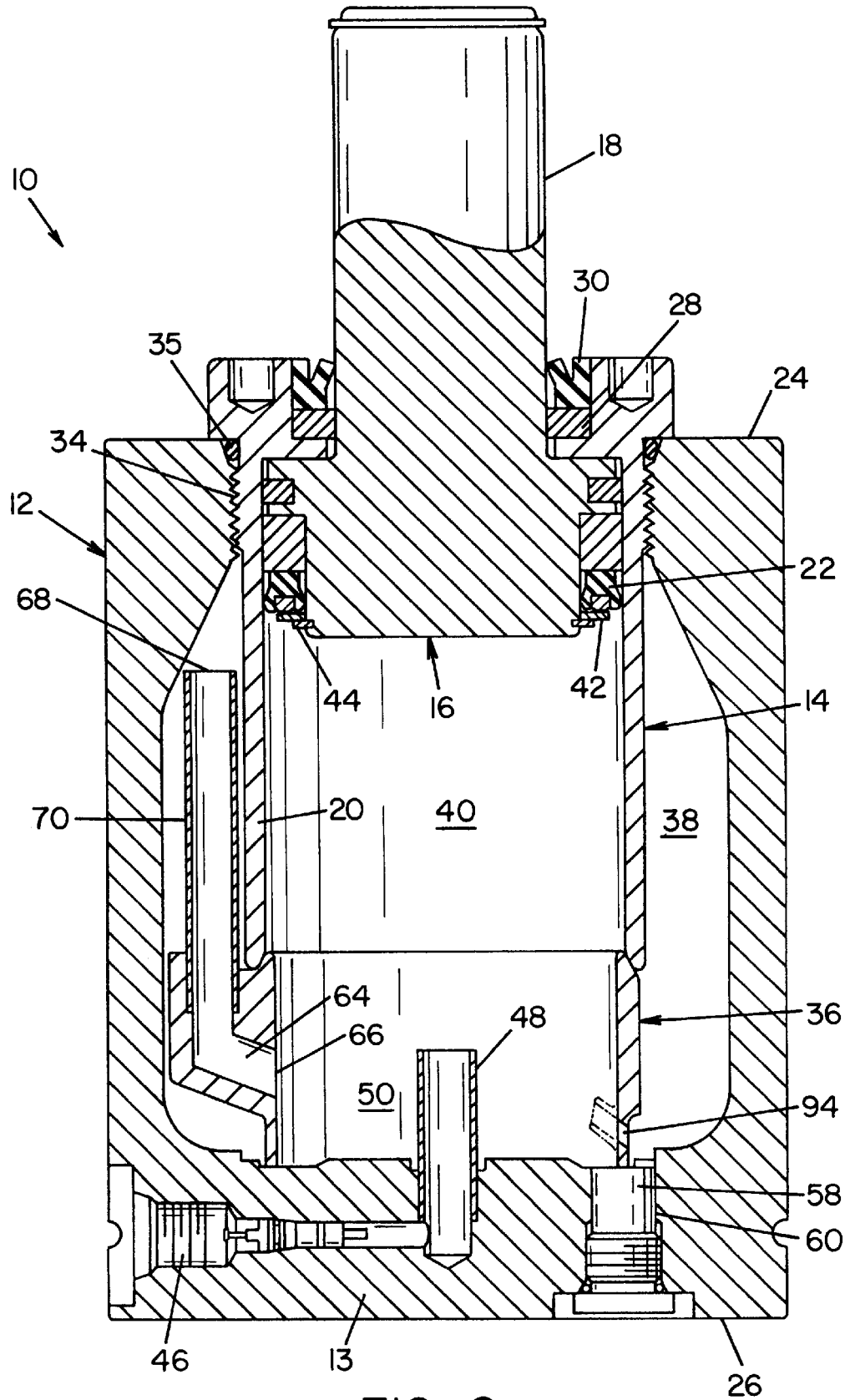
FIG. 9 is a front view, partially in cross section, of a second preferred embodiment of a self-lubricating nitrogen die cylinder in accordance with the present invention.

Referring next to FIG. 9, a second preferred embodiment of a die cylinder is shown. In this embodiment, instead of utilizing recess 56 as a path between the expansion reservoir and the well 50 (and thus the working area), an aperture or duct 94 is provided through annular insert 36. As described with respect to recess 56 in the embodiment above, the duct 94 is positioned so as to be provided below the level of the lubricating oil 90 when the die cylinder is oriented in the upright position, as shown in FIG. 9, and is positioned so as to be provided above the level of the lubricating oil 90 when the die cylinder is oriented in the inverted position. The second preferred embodiment operates in the same fashion as the first preferred embodiment, with the duct 94 performing the functions performed by the recess 56. For this reason, the duct 94 is specifically designed to create a small resistance to fluid flow. Also, since recess 56 is no longer utilized in this embodiment, plug 58 may be sized and configured to extend fully into bore 60, so that there is no recess provided upon the lower body portion 13. Further, bore 60 may be provided elsewhere or entirely eliminated on the cylinder body 12.

While certain presently preferred embodiments have been shown and described, it is distinctly understood that the invention is not limited thereto and may be otherwise embodied within the scope of the following claims.

We claim:

1. A cushion assembly for use in a press operable in an upright orientation and in an inverted orientation, and said cushion assembly containing a working fluid under pressure and containing lubricating oil so as to have a level of lubricating oil at a first end of said cushion assembly when in the upright orientation and to have a level of lubricating oil at a second end of said cushion assembly opposite to said first end when in the inverted orientation, said cushion assembly comprising:

a hollow outer housing having sidewalls that terminate at an end wall at said first end of said cushion assembly, and that terminate in an opening at said second end of said cushion assembly;

an interior wall assembly having a connection portion for connection to said outer housing at said second end of said cushion assembly, and having walls extending outward from said connection portion within said outer housing to said housing end wall, in which a portion of said wall assembly walls have a piston mounted for reciprocal motion therebetween; and wherein a variable volume wall assembly space is defined as a space between said piston, said wall assembly walls and said housing end wall; and wherein an expansion reservoir is defined as a space between said housing sidewalls, said wall assembly walls and said housing end wall;

a first passage having an opening to said wall assembly space and having an opening to said expansion reservoir, wherein at least said first passage expansion reservoir opening is below the level of lubricating oil when the cushion assembly is in the upright orientation, and both first passage openings are above the level of lubricating oil when the cushion assembly is in the inverted orientation; and a second passage having an opening to said wall assembly space and having an opening to said expansion reservoir, wherein both second passage openings are above the level of lubricating oil when the cushion assembly is in the upright orientation, and wherein the second passage expansion reservoir opening is below the level of lubricating oil and the second passage wall assembly opening is above the level of lubricating oil when the cushion assembly is in the inverted orientation.

2. The cushion assembly of claim 1 wherein said wall assembly walls are formed of a cylinder liner in connection with an annular insert, wherein said cylinder liner is said portion of said wall assembly walls having said piston mounted for reciprocal motion therebetween, and said annular insert is in contact with said housing end wall.

3. The cushion assembly of claim 2 wherein said annular insert is formed of a plurality of components.

4. The cushion assembly of claim 2 wherein said second passage is disposed through said annular insert.

5. The cushion assembly of claim 4 wherein said second passage includes a standpipe which extends toward the second end of said cushion assembly, wherein said standpipe opens at one end to said expansion reservoir at a point above the level of lubricating oil when the cushion assembly is in the upright orientation and below the level of lubricating oil when the cushion assembly is in the inverted orientation, and said standpipe connects at an opposite end to said annular insert.

6. The cushion assembly of claim 5 wherein said annular insert is formed of a plurality of components.

7. The cushion assembly of claim 1 wherein a recess is provided upon said housing endwall, and said wall assembly walls intersect said recess, wherein said first passage is formed from the intersection of said wall assembly walls and said recess.

8. The cushion assembly of claim 7 wherein said recess is formed by a bore provided through said housing endwall and a plug disposed partially within said bore from outside of said housing.

9. The cushion assembly of claim 8 wherein said plug is removable from said bore.

10. The cushion assembly of claim 7 wherein said wall assembly walls are formed of a cylinder liner in connection with an annular insert, wherein said cylinder liner is said portion of said wall assembly walls having said piston mounted for reciprical motion therebetween, and said annular insert intersects said recess at said housing end wall.

11. The cushion assembly of claim 8 wherein said annular insert is formed of a plurality of components.

12. The cushion assembly of claim 1 wherein said first passage is an aperture disposed through said wall assembly wall.

13. The cushion assembly of claim 12 wherein said wall assembly walls are formed of a cylinder liner in connection with an annular insert, wherein said cylinder liner is said portion of said wall assembly walls having said piston mounted for reciprical motion therebetween, and said annular insert is in contact with said housing end wall, and wherein said aperture forming said first passage is disposed through said annular insert.

14. The cushion assembly of claim 13 wherein said first passage further includes a duct disposed through said aperture.

15. The cushion assembly of claim 13 wherein said annular insert is formed of a plurality of components.

16. The cushion assembly of claim 1 wherein said first passage includes fluid flow restriction means.

17. The cushion assembly of claim 1 wherein said second passage includes fluid flow restriction means.

18. A cushion assembly for use in a press, said cushion assembly containing a working fluid under pressure and containing lubricating oil so as to have a level of lubricating oil at a first end of said cushion assembly when in the upright orientation, said cushion assembly comprising:
 a hollow outer housing having sidewalls that terminate at an end wall at said first end of said cushion assembly, and that terminate in an opening at said second end of said cushion assembly;
 an interior wall assembly having a connection portion for connection to said outer housing at said second end of said cushion assembly, and having walls extending outward from said connection portion within said outer housing to said housing end wall, in which a portion of said wall assembly walls have a piston mounted for reciprocal motion therebetween; and wherein a variable volume wall assembly space is defined as a space between said piston, said wall assembly walls and said housing end wall; and wherein an expansion reservoir is defined as a space between said housing sidewalls, said wall assembly walls and said housing end wall;
 a first passage having an opening to said wall assembly space and having an opening to said expansion reservoir, wherein said first passage expansion reservoir opening is below the level of lubricating oil when the cushion assembly is in the upright orientation; and
 a second passage having an opening to said wall assembly space and having an opening to said expansion reservoir, wherein both second passage openings are above the level of lubricating oil when the cushion assembly is in the upright orientation.

19. A cushion assembly for use in a press, said cushion assembly containing a working fluid under pressure and containing lubricating oil so as to have a level of lubricating oil at a first end of said cushion assembly when in the upright orientation, said cushion assembly comprising:
 a hollow outer housing having sidewalls that terminate at an end wall at said first end of said cushion assembly, and that terminate in an opening at said second end of said cushion assembly;
 an interior wall assembly having a connection portion for connection to said outer housing at said second end of said cushion assembly, and having walls extending outward from said connection portion within said outer housing to said housing end wall, in which a portion of said wall assembly walls have a piston mounted for reciprocal motion therebetween; and wherein a variable volume wall assembly space is defined as a space between said piston, said wall assembly walls and said housing sidewalls, said wall assembly walls and said housing end wall,
 a first passage having an opening to said wall assembly space and having an opening to said expansion reservoir, wherein said first passage expansion reservoir opening is below the level of lubricating oil when the cushion assembly is in the upright orientation;
 a second passage having an opening to said wall assembly space and having an opening to said expansion reservoir, wherein both second passage openings are above the level of lubricating oil when the cushion assembly is in the upright orientation; and,
 both first passage openings being below the level of lubricating oil when the cushion assembly is in the upright orientation.

20. The cushion assembly of claim 18, wherein said wall assembly walls are formed of a cylinder liner in connection with an annular insert, wherein said cylinder liner is said portion of said wall assembly walls having said piston mounted for reciprocal motion therebetween, and said annular insert is in contact with said housing end wall.

21. The cushion assembly of claim 20 wherein said annular insert is formed of a plurality of components.

22. The cushion assembly of claim 20 wherein said second passage is disposed through said annular insert.

23. The cushion assembly of claim 22 wherein said second passage includes a standpipe which extends toward the second end of said cushion assembly, wherein said standpipe opens at one end to said expansion reservoir at a point above the level of lubricating oil when the cushion assembly is in the upright orientation and below the level of lubricating oil when the cushion assembly is in the inverted orientation, and said standpipe connects at an opposite end to said annular insert.

24. The cushion assembly of claim 23, wherein said annular insert is formed of a plurality of components.

25. A cushion assembly for use in a press, said cushion assembly containing a working fluid under pressure and containing lubricating oil so as to have a level of lubricating oil at a first end of said cushion assembly when in the upright orientation, said cushion assembly comprising:
 a hollow outer housing having sidewalls that terminate at an end wall at said first end of said cushion assembly, and that terminate in an opening at said second end of said cushion assembly;
 an interior wall assembly having a connection portion for connection to said outer housing at said second end of said cushion assembly, and having walls extending outward from said connection portion within said outer housing to said housing end wall, in which a portion of said wall assembly walls have a piston mounted for reciprocal motion therebetween; and wherein a variable volume wall assembly space is defined as a space between said piston said wall assembly walls and said housing sidewalls, said wall assembly walls and said housing end wall;
 a first passage having an opening to said wall assembly space and having an opening to said expansion reservoir, wherein said first passage expansion reservoir opening is below the level of lubricating oil when the cushion assembly is in the upright orientation;

a second passage having an opening to said wall assembly space and having an opening to said expansion reservoir, wherein both second passage openings are above the level of lubricating oil when the cushion assembly is in the upright orientation; and, a recess upon said housing end wall, and said wall assembly walls intersecting said recess, wherein said first passage is formed from the intersection of said wall assembly walls and said recess.

26. The cushion assembly of claim 25, wherein said recess is formed by a bore provided through said housing endwall and a plug disposed partially within said bore from outside of said housing.

27. The cushion assembly of claim 26 wherein said plug is removable from said bore.

28. A cushion assembly for use in a press operable in an inverted orientation, and said cushion assembly containing a working fluid under pressure and containing lubricating oil so as to have a level of lubricating oil at a second end of said cushion assembly opposite to a first end, said cushion assembly comprising:

a hollow outer housing having sidewalls that terminate at an end wall at said first end of said cushion assembly, and that terminate in an opening at said second end of said cushion assembly;

an interior wall assembly having a connection portion for connection to said outer housing at said second end of said cushion assembly, and having walls extending outward from said connection portion within said outer housing to said housing end wall, in which a portion of said wall assembly walls have a piston mounted for reciprocal motion therebetween; and wherein a variable volume wall assembly space is defined as a space between said piston, said wall assembly walls and said housing end wall; and wherein an expansion reservoir is defined as a space between said housing sidewalls, said wall assembly walls and said housing end wall;

a first passage having an opening to said wall assembly space and having an opening to said expansion reservoir, wherein both first passage openings are above the level of lubricating oil when the cushion assembly is in the inverted orientation; and a second passage having an opening to said wall assembly space and having an opening to said expansion reservoir, and wherein the second passage expansion reservoir opening is below the level of lubricating oil and the second passage wall assembly opening is above the level of lubricating oil when the cushion assembly is in the inverted orientation.

29. The cushion assembly of claim 28 wherein said wall assembly walls are formed of a cylinder liner in connection with an annular insert, wherein said cylinder liner is said portion of said wall assembly walls having said piston mounted for reciprocal motion therebetween, and said annular insert is in contact with said housing end wall.

30. The cushion assembly of claim 29 wherein said annular insert is formed of a plurality of components.

31. The cushion assembly of claim 29 wherein said second passage is disposed through said annular insert.

32. The cushion assembly of claim 31 wherein said second passage includes a standpipe which extends toward the second end of said cushion assembly, wherein said standpipe opens at one end to said expansion reservoir at a point above the level of lubricating oil when the cushion assembly is in the upright orientation and below the level of lubricating oil when the cushion assembly is in the inverted orientation, and said standpipe connects at an opposite end to said annular insert.

33. The cushion assembly of claim 32 wherein said annular insert is formed of a plurality of components.

34. The cushion assembly of claim 28 wherein a recess is provided upon said housing endwall, and said wall assembly walls intersect said recess, wherein said first passage is formed from the intersection of said wall assembly walls and said recess.

35. The cushion assembly of claim 34 wherein said recess is formed by a bore provided through said housing endwall and a plug disposed partially within said bore from outside of said housing.

36. The cushion assembly of claim 35 wherein said plug is removable from said bore.

* * * * *